Dec. 10, 1929.  E. E. HILL ET AL  1,739,142
SWITCH BOX COVER AND ATTACHMENT
Filed April 10, 1924  2 Sheets-Sheet 1
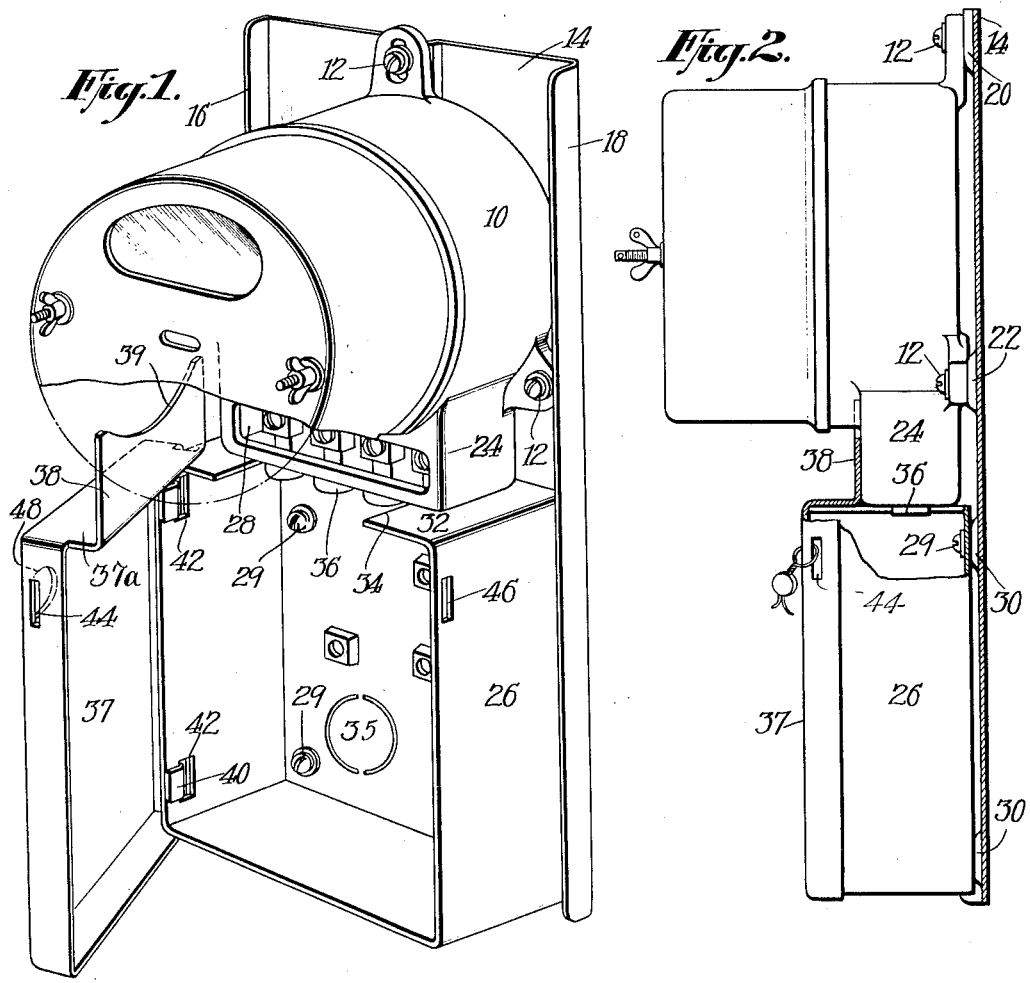
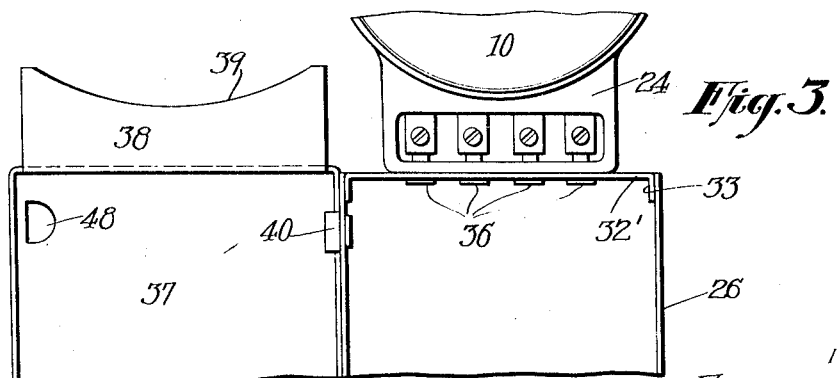
INVENTOR
EDWARD E. HILL.
FRANK V. MAGALHAES.
BY D. Anthony Usina
ATTORNEY Dec. 10, 1929.　　　E. E. HILL ET AL　　　1,739,142
SWITCH BOX COVER AND ATTACHMENT
Filed April 10, 1924　　　2 Sheets-Sheet 2
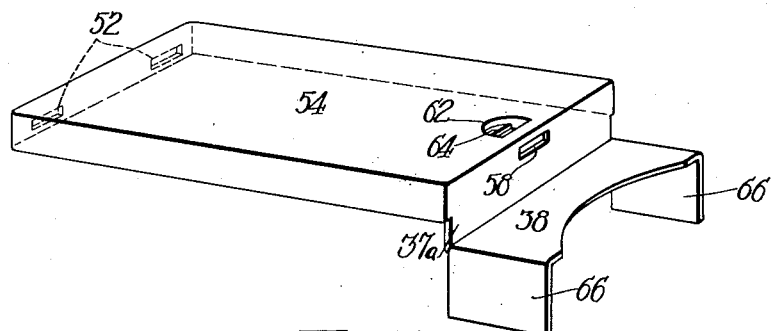
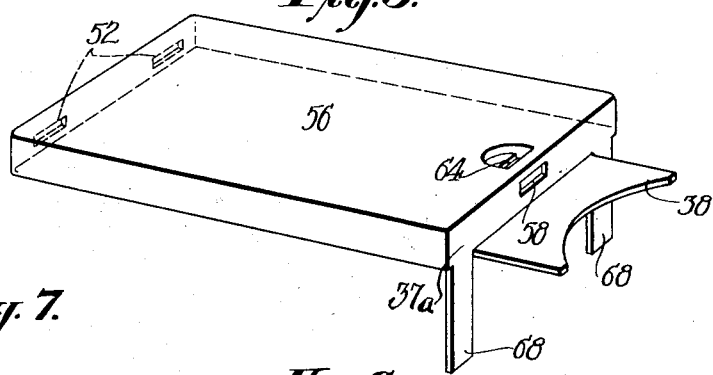
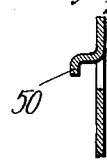
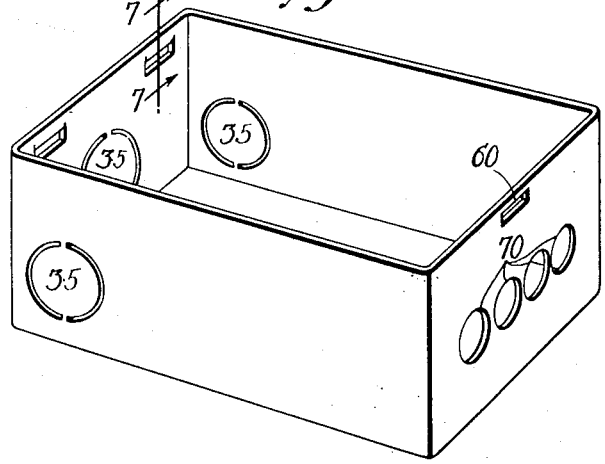
INVENTOR
EDWARD E. HILL.
BY FRANK V. MAGALHAES.
ATTORNEY Patented Dec. 10, 1929

1,739,142

UNITED STATES PATENT OFFICE

EDWARD EMIL HILL, OF WOODHAVEN, AND FRANK V. MAGALHAES, OF BROOKLYN, NEW YORK, ASSIGNORS, BY MESNE ASSIGNMENTS, TO THOMAS E. MURRAY, JR., OF BROOKLYN, NEW YORK

SWITCH-BOX COVER AND ATTACHMENT

Application filed April 10, 1924. Serial No. 705,408.

In connection with electric meters it is common practice to employ a cut-out box for enclosing the switches, fuses and the like for use in cutting out or testing the meter. Such boxes are usually sealed and must be closely connected with the meter casing in order to prevent tampering with the meter terminals or with the connections inside the box. Meter casings of various shapes and designs have heretofore been used, requiring a special box for each design of meter or supplementary adapters have been used for closing the space between the meter casing and the cut-out box and special closures have been required to cover the terminal chamber of the meter.

Our invention provides a box which can be used in connection with various types or designs or meters, and which presents certain features of improvement hereinafter referred to.

Embodiments of the invention are illustrated in the accompanying drawings in which Fig. 1 is a perspective view of a meter mounted on a panel having a cut-out box embodying our invention secured thereto;

Fig. 2 is a side elevation of the assemblage shown in Fig. 1 with parts shown in section in the interest of clearness;

Fig. 3 is a fragmentary front view illustrating a modification;

Figs. 4 and 5 are perspective views showing modified forms of cut-out box covers;

Fig. 6 is a perspective detail of a slightly modified form of cut-out box with the cover removed, this type of box being suitable for use in connection with the cover shown in Figs. 4 and 5;

Fig. 7 is a detail section on line 7—7 of Fig. 6.

Referring in detail to the drawings, the meter 10 is secured by screws 12 to a supporting plate or panel 14 which is conveniently made of pressed metal having side flanges 16 and 18 and pressed out bearing bosses 20 and 22 against which the supporting lugs of the meter are seated. The meter is provided on its lower end with a terminal chamber 24 within which are located the usual binding posts for the conductors or terminals which lead to suitable connections on a switch or cut-out of known design ordinarily mounted within the cut-out box 26. The terminal chamber 24 of the meter is provided with an opening 28 to permit access to the binding posts located therein so as to enable workmen to make the necessary electrical connections in initially installing the meter and also to permit access to these binding posts for the purpose of testing the meter from time to time. It has heretofore been necessary to provide a closure for the terminal chamber of the meter and to seal this closure so as to prevent tampering with the terminals. In some cases this has necessitated the use of specially designed cut-out boxes in which provision was made to accommodate the terminal chamber of the meter within the box and in other cases special adapters have been used to bridge the space between the meter and the cut-out box.

The cut-out box shown in provided with means whereby the terminal chamber of the meter is closed when the cut-out box is closed and is so arranged that the meter terminals are accessivle when the cut-out box is open. The box is of such width that it fits snugly between the flanges 16 and 18 of the panel 14 and is secured thereto by screws 29 threaded into bearing bosses 30 pressed up from the sheet metal stock of the panel. The box 26 shown in Fig. 1 is pressed up from a single sheet and its walls are all integral. The upper wall 32 is cut away as at 34 to permit the terminal bushings 36 of the meter to project into the interior of the box. Certain of the walls of the box are provided with the usual knock-out portions 35 to permit the threading of conductors through the walls. The cover 37 of the box as shown in Figs. 1 to 3 is provided with an upwardly extending lip or projection 38, which when the cover is closed fits snugly against the front face of the meter terminal chamber and covers the opening 28 therein and thus prevents tampering with the meter terminals. The meter illustrated is of the cylindrical type and the extension 38 of the cover is formed with a curved outline 39 proportioned to permit the cover to be swung on the hinged portions 40 without striking the meter, the curvature of the upper edge of the projection being of a greater radius than that of the cylindrical portion of the meter. The hinge portions on which the cover swings may be made in any suitable manner and as illustrated the hinge joint is formed by the extensions 40 which engage slots 42 formed in the side walls of the cut-out box. When the cover is closed a slot 44 in the latter will substantially register with a similar slot 46 formed in the side wall of the box and a seal wire will be passed through these registered openings and out through a suitable opening 48 formed in the front face of the cover, thus locking the cover in the closed position illustrated in Fig. 2.

Instead of forming the box 26 entirely of one single piece, we can, if desired, form the walls thereof of separate pieces. For example as shown in Fig. 3, the top 32' is formed of a plate having flanges 33 which are riveted, spot-welded or otherwise secured to walls of the box 26. In this figure instead of providing the cut-out portion 34 shown in Fig. 1 for the passage of the terminals, the plate 32 is provided with suitable openings through which the meter bushings 36 project.

In Figs. 4 to 7 inclusive is shown a cut-out box of slightly modified construction. In the form shown in these figures the cover is adapted to hinge or swing outwardly about the hooks or hinges 50 formed on the lower wall of the box these being adapted to cooperate with slots 52 in the flanges of the covers 54 and 56 shown in Figs. 4 and 5. These covers are provided with an aperture 58 adapted to register with an aperture 60 in the box, the front walls of the covers being pressed in at 62 and provided with a slot 64 to permit the threading through of a sealing wire by which the cover can be locked in closed position. In Fig. 4 the projection 38 for closing the meter terminal chamber is formed with side flanges 66 which are adapted to embrace the side walls of the meter terminal chamber 24. In the construction of the cover shown in Fig. 5 the extension 38 is formed substantially like that shown in Fig. 1 but the cover is provided at each side of the extension with a projecting finger 68 adapted to overlie the top wall of the cut-out box, the edges of the fingers being adapted to engage the sides of the meter chamber. The side flanges 66 together with the extension 38 provide means for enclosing the meter terminal chamber practically in its entirety. This serves to exclude dirt and moisture from the terminal chamber.

The cut-out box may be pressed from a single piece as above described or a suitably shaped blank may be folded to produce the box, suitable flanges being provided which may be riveted, welded or otherwise secured. The box may be of various shapes other than that shown and instead of cutting away the top portion thereof as shown in Fig. 1, perforations for the passage of meter terminals may be formed as shown at 70 in Fig. 6.

The box cover of Figs. 1, 4 and 5 serves not only to close the meter terminal chamber by means of the projection 38, but also to close the space 34 through which the meter terminal bushings or other parts of the meter casing are introduced into the box. The making of the upper end wall of the box with an opening extending to the front edge makes the location of the meter casing easy; and the flange 37$^a$ on the upper end of the cover closes this opening when the box is closed. The depth of the flange will depend on the height of the meter terminal casing, being shown of extra depth in Figs. 1 and 4 and of the same depth as the side flanges in Fig. 5. Where meters are supplied with covers for their terminal casing, the projection 38 may be omitted or cut off from the switch box cover.

Though we have described with great particularity the specific construction of certain embodiments of the invention shown, it is not to be construed that we are limited thereto as various changes in arrangement and modifications may be made by those skilled in the art without departing from the invention as defined in the appended claims.

What we claim is:

1. In combination with an electric meter having exposed terminals, a cut-out box and a single cover for preventing access to the meter terminals and the interior of said cut-out box said cover having a portion in one plane overlying the box and a portion in another plane overlying the meter terminals, and fitting with its rear face against the meter casing terminal chamber.

2. In combination with an electric meter having an open terminal chamber formed on the end portion thereof, a cut-out box having an end engaged by the end of said terminal chamber and having an opening through which the meter terminals project and a cover for said box having a portion extending beyond the end of the box and adapted to cover the meter terminal chamber.

3. In combination with an electric meter and a supporting panel therefor, a cut-out box secured to said panel with its end in engagement with the end of the meter casing, said box having a cover with an extension beyond the end of the box adapted to cover the terminals of said meter.

4. In combination with an electric meter having an open terminal chamber, a cut-out box with an end wall which engages the end of the chamber and through which the meter terminals pass and a cover for the cut-out box including a closure extending beyond said end wall for the meter terminal chamber.

5. In combination with an electric meter having a terminal chamber with one wall through which conductors are passed and a second wall with an opening giving access to said conductors, a cut-out box having an end wall engaged by the end of the terminal chamber and cut away to provide an opening extending to the front face of the box and a cover for said cut-out box having a portion overlying the opening in said end wall of the box and a portion overlying said opening in the terminal chamber.

6. In combination a meter service box having an aperture in an end wall for passage of conductors, a meter provided with a terminal chamber having one wall through which conductors are passed and a second wall with an opening giving access to said conductors, and a plate attached to the box and so positioned thereon that with the meter assembled adjacent the box with the said first terminal chamber wall in contact with the said box end wall, the said plate covers the opening in said second wall of the meter terminal chamber.

7. In combination a meter service box having an aperture in an end wall for passage of conductors, a meter provided with a terminal chamber having one wall through which conductors are passed and a second wall with an opening giving access to said conductors, and a plate forming part of a cover of the box and so positioned thereon that with the meter assembled adjacent the box with the said first terminal chamber wall in contact with the said box end wall, the said plate covers the opening in said second wall of the meter terminal chamber.

8. A meter service box adapted for use with a meter casing having one wall through which conductors are passed and a second wall with an opening giving access to said conductors, and a plate attached to the box and so positioned thereon that with the meter casing assembled adjacent the box with said first meter casing wall in contact with the box end wall, the said plate covers the opening in said second wall of the meter casing.

9. A meter service box adapted for use with a meter casing having one wall through which conductors are passed and a second wall with an opening giving access to said conductors, and a plate forming part of a cover of the box and so positioned thereon that with the meter casing assembled adjacent the box with said first meter casing wall in contact with the box end wall, the said plate covers the opening in said second wall of the meter casing.

10. In combination with an electric meter casing having a terminal chamber through the end wall of which the conductors pass, a cut-out box having an end wall, which is cut away to provide an opening for the passage of the conductors, said opening extending forwardly to the front face of the box but being of less width than the end wall of the meter casing so that the latter abuts against the end wall of the box without passing through the same, and a cover for said cut-out box having a portion overlying the end wall of the box and engaging the abutting end of the meter casing.

In witness whereof, we have hereunto signed our names.

EDWARD EMIL HILL.
FRANK V. MAGALHAES.